July 16, 1929.  W. H. DUGGAN  1,720,948
CONTAINER AND HANDLE MEANS
Filed Aug. 22, 1927
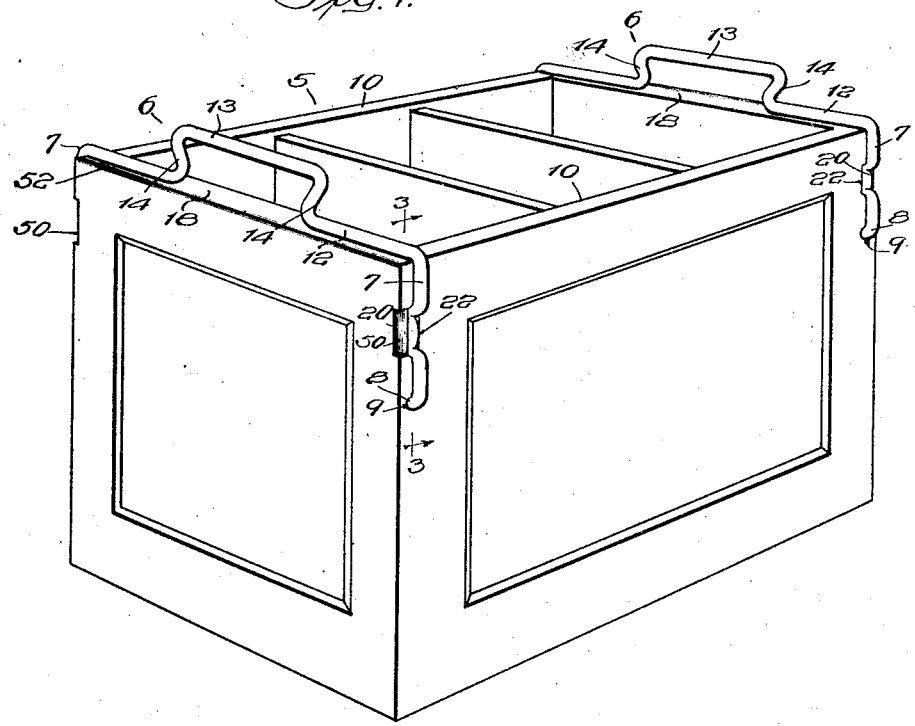
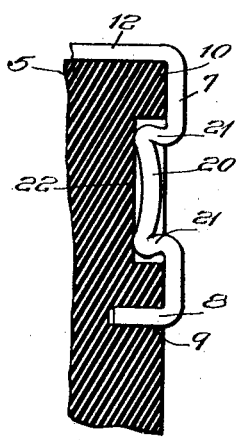
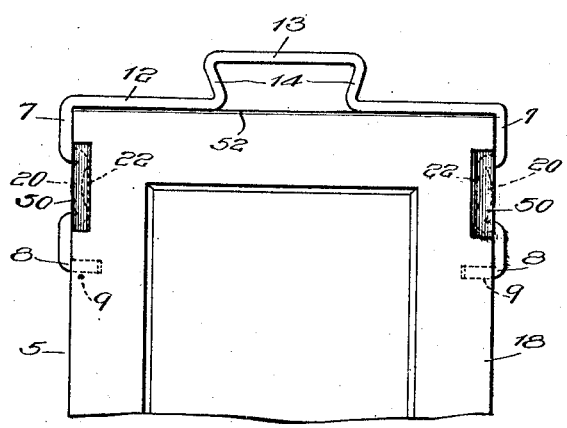
Witness:
William P. Kilroy
Inventor:
William H. Duggan
Brown, Boettcher & Wiener
By Attys Patented July 16, 1929.

1,720,948

UNITED STATES PATENT OFFICE.

WILLIAM H. DUGGAN, OF CHICAGO, ILLINOIS, ASSIGNOR, BY MESNE ASSIGNMENTS, OF FOUR-TENTHS TO BENJAMIN CLARKE, ONE-TENTH TO C. W. CLARKE, AND ONE-TENTH TO FRANK M. CLARKE, ALL OF CHICAGO, ILLINOIS.

CONTAINER AND HANDLE MEANS.

Application filed August 22, 1927. Serial No. 214,558.

This invention relates to container and handle means for storage batteries and the like, and its object is the provision of a generally improved and simplified handle means that may be economically produced and readily and inexpensively applied.

The invention is illustrated in the accompanying drawing, in which

Fig. 1 is a perspective view of a battery and handle means embodying the present invention;

Fig. 2 is a fragmentary end view of the same; and

Fig. 3 is a fragmentary vertical detail section taken on the line 3—3 of Fig. 1.

Referring to the drawing, the container is illustrated generally at 5. Where the container is to be used for storage batteries or the like, it may be formed of hard rubber, composition, or other suitable material.

The handle means comprises a pair of separate bail handles 6, having their end portions turned down at 7 and terminating in inturned ends 8 which engage in sockets 9 in the side walls 10 of the container.

The handles are preferably of spring metal wire or of rod or other suitable resilient material, and the intermediate connecting portions 12 between the downturned ends 7 have handle loops or bights 13, each preferably with its sides 14 tapered or spread upwardly or of dovetail formation, as shown. The bights 13 serve the dual function of providing handles and freeing the side portions 7 for spreading over the sides 10 of the container to enter the inturned ends 8 in the sockets 9.

The handles 6 are somewhat similar to the familiar bucket bails and are conveniently applied by spreading the inturned ends 8 over the sides of the container and entering them in the sockets 9. The entire handle may then be swung about the common transverse axis of the inturned ends 8 up over the adjacent end of the container to position the handle vertically with the connecting portion 12 arranged along the upper edge or top of the end wall 18 of the container.

For the purpose of holding the handle in upright position and against accidentally swinging into contact with conducting parts of the battery, the downturned end portions 7 of each handle 6 are provided with inset bights 20 which, when the handle is in operative or vertical position, engage in vertically elongated sockets or grooves 22 in the side walls of the container, the cooperation of the opposing vertical shoulders of these grooves 22 with the downturned end portions 7 of the handle, holding the handle firmly in upright position and against accidental displacement therefrom.

To permit swinging the handle around or over the end of the container and into the vertical position shown, with the inturned ends 8 engaged in the sockets 9, the sides 21 of the inset bights 20 are preferably spread inwardly, as shown. This permits sufficient spread between the inturned ends 8 and the connecting portion 12 to permit the connecting portion to be swung over the end of the container and into position over the top thereof with the ends 8 engaged in the sockets 9.

The corners of the ends of the container may be rounded or tapered at 50 to permit springing the bights or offset portions 20 over the ends of the container and the outer corner of the upper edge may be broken or rounded at 52 to permit springing the portions 12 over the same.

Upon being positioned vertically or in operative position, the resiliency of the handle contracts it snugly upon the container with the bights 20 in the grooves 22, and the spread formation of the handle loops or bights 13 is such that where a lifting stress is imposed the sides of the handle are contracted upon the sides of the container thereby, and where a hold-down is engaged with the handle to hold the container or battery down therethrough, the downward stress imposed also serves to contract the sides of the handle snugly and firmly upon the container.

The inturned ends 8 may extend in further or deeper than the bights 20, as shown, to permit spreading of the bights over the sides of the container without entirely disengaging the ends 8 from the sockets 9.

I claim:—

1. As an article of manufacture, a spring metal bail handle having downturned side portions, a connecting portion therebetween, inturned ends at the ends of said downturned side portions, and bights in said side portions formed to permit spreading between the connecting portion and the inturned ends.

2. As an article of manufacture, a spring metal bail handle having downturned side portions, a connecting portion therebetween, inturned ends at the ends of said downturned sides, bights in said sides formed to permit spreading between the connecting portion and the inturned ends, and a bight in the connecting portion forming a handle and permitting spreading of the downturned sides.

3. In combination, a container having a plurality of downwardly faced shoulders on opposite sides of the container and a handle having downwardly extending sides with inturned ends pivoted in the opposite sides of the container, said downwardly extending sides having corrugated portions above said inturned ends, the corrugations forming shoulders engaging the shoulders of the container, said handle being formed of resilient material permitting the springing of the ends of the handle over the side walls into position in engagement with the shoulders of the container.

4. In combination a container having a plurality of sockets arranged in opposing walls of the container and a handle having downwardly extending sides with inturned ends pivoted in the opposite sides of the container, said downwardly extending sides having corrugated portions above said inturned ends, said corrugations forming shoulders extending into the sockets, said handle being formed of resilient material permitting the springing of the shoulders of the handle into position in the sockets of the walls.

5. In combination, a battery container having a pair of opposite walls, said walls each having a pair of sockets formed directly in the body of the wall one below the other, a spring metal bail handle having a connecting portion adapted to overlie and seating upon the top of the container, said handle having its opposite ends turned down along the socketed walls of the container, said down turned ends terminating in inturned ends pivotally engageable in said lower sockets, and bights in the down turned sides of the handle and engageable with said upper sockets to hold said handle in upright position and said connecting portion seated upon the top of the container.

6. In combination, a battery container having a pair of opposite walls, said walls each having a pair of sockets formed directly in the body of the wall one below the other, a spring metal bail handle having a connecting portion adapted to overlie and seating upon the top of the container, said handle having its opposite ends turned down along the socketed walls of the container, said down turned ends terminating in inturned ends pivotally engageable in said lower sockets, bights in the down turned sides of the handle and engageable with said upper sockets to hold said handle in upright position and said connecting portion seated upon the top of the container, said sockets being adjacent the end of the container and the corners of the container being removed adjacent said upper sockets to permit springing said side bights over the end of the container and into engagement with said upper sockets.

In witness whereof, I hereunto subscribe my name August, 1927.

WILLIAM H. DUGGAN.